(12) United States Patent
Valimaki et al.

(10) Patent No.: US 7,890,511 B2
(45) Date of Patent: Feb. 15, 2011

(54) SYSTEM AND METHOD FOR CONDUCTING NETWORK ANALYTICS

(75) Inventors: Mikko Valimaki, Orem, UT (US); Joshua Dinerstein, West Valley, UT (US); Mark Jensen, Bluffdale, UT (US); J. Michael Fonnesbeck, Lehi, UT (US); James Pettit Whitechurch, Draper, UT (US); John Lyman Ahlander, Orem, UT (US)

(73) Assignee: Blue Coat Systems, Inc., Sunnyvale, CA (US)

(*) Notice: Subject to any disclaimer, the term of this patent is extended or adjusted under 35 U.S.C. 154(b) by 343 days.

(21) Appl. No.: 12/026,475

(22) Filed: Feb. 5, 2008

(65) Prior Publication Data

US 2009/0198724 A1    Aug. 6, 2009

(51) Int. Cl.
    *G06F 17/30* (2006.01)
(52) U.S. Cl. .................................................. 707/737
(58) Field of Classification Search ................... 707/737
    See application file for complete search history.

(56) References Cited

U.S. PATENT DOCUMENTS

| | | | |
|---|---|---|---|
| 5,892,917 A * | 4/1999 | Myerson | 709/224 |
| 6,182,097 B1 * | 1/2001 | Hansen et al. | 715/234 |
| 6,223,215 B1 * | 4/2001 | Hunt et al. | 709/217 |
| 7,051,029 B1 * | 5/2006 | Fayyad et al. | 1/1 |
| 7,779,127 B2 * | 8/2010 | Cherkasova et al. | 709/226 |
| 2002/0143925 A1 * | 10/2002 | Pricer et al. | 709/224 |
| 2003/0023715 A1 * | 1/2003 | Reiner et al. | 709/224 |
| 2007/0219754 A1 * | 9/2007 | D'Ambrosio | 702/188 |
| 2007/0239452 A1 * | 10/2007 | Madhavan et al. | 704/252 |
| 2008/0235368 A1 * | 9/2008 | Nagaraj et al. | 709/224 |

OTHER PUBLICATIONS

Burnett, Forensic Log Parsing with Microsoft's LogParser, Jul. 17, 2003, (accessed Apr. 14, 2010 at http://www.symantec.com/connect/articles/forensic-log-parsing-microsofts-logparser).*

* cited by examiner

*Primary Examiner*—James Trujillo
*Assistant Examiner*—William Spieler
(74) *Attorney, Agent, or Firm*—SNR Denton US LLP

(57) ABSTRACT

A log file from a server is analyzed and entries in the log file are deleted, combined, or condensed to create a list of page views that more accurately reflects traffic to a server. The list of page views may be added to a database for searching, sorting, and analyzing the page views.

8 Claims, 4 Drawing Sheets

10

Software: SOOS 4.2.2.5
Version: 1.0
Start-Date: 2006-11-16 08:00:00
Date: 2006-11-06 21:01:12
Fields: date time time-taken c-ip sc-status s-action sc-bytes cs-bytes cs-method
cs-uri-scheme cs-host cs-uri-port cs-uri-path cs-uri-query cs-username cs-auth-group
s-hierarchy s-supplier-name rs(Content-Type) cs(Referer) cs(User-Agent)
sc-filter-result cs-categories x-virus-id s-ip
Remark: 4505020137 "BC-IrvingPk"
2006-11-16 12:08:11 2 10.7.106.5 407 TCP_DENIED 1114 419 GET http
www.ohiostate.theinsiders.com 80 / - - -NONE-... "Mozilla/4.0 (compatible; MSIE
6.0; Windows NT 5.0; .NET CLR 1.1.4322)" DENIED "Sports/Recreation/Hobbies" -
10.7.121.100
2006-11-16 12:08:11 228 10.7.106.5 301 TCP_NC_MISS 582 682 GET http
www.ohiostate.theinsiders.com 80 / - CAF-MW CORUS\DomainK20Users DIRECT
www.ohiostate.theinsiders.com - "Mozilla/4.0 (compatible; MSIE 6.0; Windows NT
5.0; .NET CLR 1.1.4322)" OBSERVED "Sports/Recreation/Hobbies" - 10.7.121.100
2006-11-16 12:08:12 180 10.7.106.5 301 TCP_NC_MISS 392 628 GET http
www.ohiostate.scout.com 80 /index.html - CAF-MW CORUS\DomainK20Users DIRECT
www.ohiostate.scout.com - - "Mozilla/4.0 (compatible; MSIE 6.0; Windw NT 5.0; .NET
CLR 1.1.4322)" OBSERVED "Sports/Recreation/Hobbies" - 10.7.121.100
2006-11-16 12:08:12 2 10.7.106.5 407 TCP_DENIED 1114 556 GET http global.scout.com
80/css/145.css --- NONE--http://ohiostate.scout.com/ "Mozilla/4.0 (compatible;
MSIE 6.0; Windows NT 5.0; .NET CLR 1.1.4322)" DENIED "Sports/Recreation/Hobbies" -
10.7.121.100
2006-11-16 12:08:12 15 10.7.106.5 407 TCP_DENIED 1368 675 GET http global.scout.com
80/css/145.css --- NONE--http://ohiostate.scout.com/ .NET CLR 1.1.4322)" DENIED "Sports/Recreation/Hobbies" -
MSIE 6.0; Windows NT 5.0; .NET CLR 1.1.4322)" DENIED "Sports/Recreation/Hobbies" -
10.7.121.100

2006-11-16  12:08:12  27  10.7.106.5  304  TCP_HIT  297  811  GET  http  global.scout.com  80 /css/145.css - CAF-MW CORUS\DomainK20Users DIRECT 216.187.121.100 text/css http://ohiostate.scout.com/ "Mozilla/4.0 (compatible; MSIE 6.0; Windows NT 5.0; .NET CLR 1.1.4322)" OBSERVED "Sports/Recreation/Hobbies" - 10.7.121.100
2006-11-16  12:08:12  3  10.7.106.5  304  TCP_HIT  297  562  GET http global.scout.com 80 /css/globalnew.css - CAF-MW CORUS\DomainK20Users DIRECT 216.187.121.100 text/css http://www.ohiostate.scout.com -- "Mozilla/4.0 (compatible; MSIE 6.0; Windw NT 5.0; .NET CLR 1.1.4322)" OBSERVED "Sports/Recreation/Hobbies" - 10.7.121.100
2006-11-16  12:08:12  2  10.7.106.5  304  TCP_HIT  313  577  GET http global.scout.com 80 /css/global.js.css - CAF-MW CORUS\DomainK20Users DIRECT 216.187.121.100 application/x-javascript http://ohiostate.scout.com/ "Mozilla/4.0 (compatible; MSIE 6.0; Windows NT 5.0; .NET CLR 1.1.4322)" OBSERVED "Sports/Recreation/Hobbies" - 10.7.121.100
2006-11-16  12:08:12  2  10.7.106.5  304  TCP_HIT  311  554  GET http cp.scout.com 80 /ohiostate/100cp.js - CAF-MW CORUS\DomainK20Users DIRECT 216.187.121.100 application/x-javascript http://ohiostate.scout.com/ "Mozilla/4.0 (compatible; MSIE 6.0; Windows NT 5.0; .NET CLR 1.1.4322)" OBSERVED "Sports/Recreation/Hobbies" - 10.7.121.100
2006-11-16  12:08:12  5  10.7.106.5  304  TCP_HIT  298  570  GET http media.scout.com 80 /media/jfd/145/bgcolShdw.gif - CAF-MW CORUS\DomainK20Users DIRECT 209.242.19.102 image/gif http://ohiostate.scout.com/ "Mozilla/4.0 (compatible; MSIE 6.0; Windows NT 5.0; .NET CLR 1.1.4322)" OBSERVED "Sports/Recreation/Hobbies" - 10.7.121.100
2006-11-16  12:08:12  652  10.7.106.5  200  TCP_MISS  70104  728  GET http ohiostate.scout.com 80 / - CAF-MW CORUS\DomainK20Users DIRECT ohiostate.scout.com text/html - "Mozilla/4.0 (compatible; MSIE 6.0; Windw NT 5.0;.NET CLR 1.1.4322)" OBSERVED "Sports/Recreation/Hobbies" - 10.7.121.100
2006-11-16  12:08:13  110  10.7.106.5  200  TCP_NC_MISS  383  780  GET http www.google-analytics.com 80 /__utm.gif ?utmwv=9531660708&utmcs=utf-8&utmsr=1280x1024&utmsc=32-bit&utmul=en-us&utmje=1 &utmfl--&utmdt-Ohio%20Buckeyes%20Football%20Basketball%20and%20Recruit

SYSTEM AND METHOD FOR CONDUCTING NETWORK ANALYTICS

FIELD OF THE INVENTION

The present invention relates to a system and method for conducting network analytics, and more particularly to methods of reporting network traffic.

BACKGROUND OF THE INVENTION

Use of the Internet as a means for accessing information, shopping, entertainment, research, or performing functions such as paying bills or even registering to vote has become ubiquitous. However, relatively few Internet business models have succeeded. Those that have often rely on advertising revenue for a significant portion (if not all) of the business' income. Because of the number of Internet businesses, competition for this advertising revenue is significant. At the same time, advertisers tend to spend their money with those businesses that can demonstrate public appeal. Hence, operators of Internet businesses need means by which they can demonstrate this appeal in an effort to win advertising revenue.

At the same time, advertisers also need means of accurately tracking traffic to those Internet businesses which they are paying to host their ads. Just as television advertising is priced based on the number of individuals likely to watch a particular program, Internet advertising is often priced based on the number of individuals that view a particular web page. Thus, measuring the number of visitors to web sites is critical to the success of both Internet businesses that sell advertising and to advertisers paying such businesses for running their ads.

In addition to its use in connection with advertising, the tracking of traffic to and from various Internet destinations is also of importance to enterprise network owners. For example, a company may wish to monitor its employees' use of company-owned computer systems to browse Internet web sites. Such information may be tracked to determine compliance with corporate policies, to monitor potential security breaches and, more generally, to ensure that the company's computer systems are not being misused.

Further, measuring the number of visitors to particular portions of a web site may assist the owner or designer of that site when it comes to planning modifications or upgrades to the site, determining what sort of content to host at the site, and/or providing navigation aids to/from other portions of the site. Likewise, content providers can benefit from such measurements inasmuch as it may help them determine what content is popular among visitors to Web sites and, therefore, what sort of content to produce in the future. In short, the tracking of Internet traffic is of great importance across a wide variety of industries.

Systems for measuring Internet traffic typically revolve around the use of log files. Log files are text files that contain records of file requests made to Internet hosts (e.g., servers and the like). Log files, however, tend to be very large and difficult to read. FIG. 1 is an example of a log file 10, or, rather, a small portion of a log file of a particular day. Although a wealth of information is included in such a file, it is not easy to extract meaningful information from such a file and doing so requires a great deal of experience and familiarity with the traffic being analyzed.

To understand why log files can be so complex and difficult to interpret, consider the network arrangement shown in FIG. 2. In this rather basic arrangement, a user at a computer system 20 is seeking to access information published at a web sited hosted by server 22. Suppose, for sake of example, this is a news web site, designated Local_News.com. The user can use a conventional web browser at computer system 20 to access the Local_News.com site and requests for web pages are passed from computer system 20, through a proxy 24 and Internet 26, to server 22 which hosts the site. In response, the requested content is returned to the web browser.

In this example, suppose the user's computer system 20 is part of a network 28 (e.g., a company's enterprise network) and proxy 24 manages all Internet requests from computers associated with that network. A proxy is a computer system that sits between a client application, such as a web browser running on a user's personal computer, and a remote computer system, such as a server where content is stored. The proxy has several functions, among them: intercepting requests to the server to see if the proxy can fulfill the requests itself (thereby improving performance), and filtering requests, for example to enforce a company's policy that employees not access certain web sites.

In this case, the proxy 24 also logs accesses to Internet resources (such as server 22) made by computers associated with network 28 and periodically sends the log files to a log server 30, where the log files are stored for later review by an analyst 32. As should be apparent, one reason the associated log files will be very complex is that they will include information for all accesses made by all computers associated with network 28. This may be dozens or even hundreds of individual computer systems.

Moreover, even simple accesses, such as the access by computer 20 to the Local_News.com server 22, involve multiple transactions. The user of computer system 20 may be interested in viewing the main web page associated with the site (e.g., Local_News.com/index), however, that web page is, in fact, not really a single page. Instead, it (like most web pages) is really a series of computer-readable instructions that tells the user's web browser how to render certain information on the display of the user's computer system 20 and where to find the information objects (images, videos, etc.) to place in designated portions of that layout. Thus when even a single web page is requested, that request may actually involve many individual transactions from many different content sources, such as an advertisement server 34 (to retrieve advertisements displayed in the context of the requested web page) and media server 36 (to retrieve video and/or images that are to be rendered within the context of the requested web page).

All of these various transactions pass through proxy 24 and are recorded as part of the log file. Thus, even a simple web page request may result in many separate entries within the log file. Multiply such requests by the dozens or hundreds of requests being made by all of the computers associated with network 28, and one can quickly see why log files are such complex documents and why analyzing log files is difficult and time consuming.

Hence, there is a need for a method and system for condensing log files into easier to understand documents for analysis.

SUMMARY OF THE INVENTION

In one embodiment, the present invention provides a scheme for condensing a log file into meaningful entries, which may be converted into records for storage in a database.

For example, multiple entries within a log file that describe traffic in a computer network may be combined into a single page view entry in a condensed log file by treating all non-unique page view entries in the log file that are recorded within a user-designated time of a page view entry in the log file as being related to the page view entry, and combining the related entries with the page view entry in the condensed log file. Alternatively, the multiple entries within the log file may be treated such that all entries in the log file that include a designated status code are considered non-page view entries, which are combined with corresponding page view entries in the condensed log file.

A further embodiment of the present invention provides for combining multiple entries within a log file into one or more page view entries in a condensed log file by classifying the entries within the log file as page view entries or non-page view entries according to a source of a request associated with each respective entry in the log file; and grouping those of the entries in the log file determined to be non-page view entries with their respective page view entries in the condensed log file. The entries within the log file may be further classified according to a status code and/or a content type in addition to the source of the request. For example, the entries within the log file may be classified as page views if the content type is text/html and the source of the request is a web browser. Criteria for classifying an entry as a page view may be modifiable by a user.

These and other features of the present invention are discussed further below.

BRIEF DESCRIPTION OF THE FIGURES

The present invention is illustrated by way of example, and not limitation, in the figures of the accompanying drawings, in which:

FIG. 1 illustrates a portion of a conventional log file;

DETAILED DESCRIPTION

Described herein are systems and methods for filtering and/or combining entries in a log file in order to create a list of page views that more understandably reports on network traffic than is the case with a conventional log file. In one embodiment, the present systems and methods provide for an accurate count of the number of browser page views and also help to compress log file data by combining referred requests for images and other objects with a respective page view request for a web page associated with those images and other objects. Although these systems and methods will be discussed with reference to certain illustrated examples, these examples are not intended to limit the scope of the present invention. Instead, the scope of the invention should be measured only in terms of the claims following this description.

Various embodiments of the present invention may be implemented with the aid of computer-implemented processes or methods (a.k.a. programs or routines) that may be rendered in any computer language and executed by any form of computer system. For convenience, the terms "client", "proxy", "processor" and "server" are used herein to refer to various computer systems. Typically, a client is a computer system (or, sometimes, a process running on a computer system) that requests content or services from another computer system, the server. Clients, proxies, and servers may be specially constructed for each of their intended purposes, or any or all of these devices may be general-purpose computer systems selectively programmed to perform such functions. In any event, the specific construction and/or configuration of these devices and/or the networks in which they operate is/are not critical to the present invention. Thus, the processes presented herein are not inherently related to any particular network, computer system or other apparatus.

Figure 2:
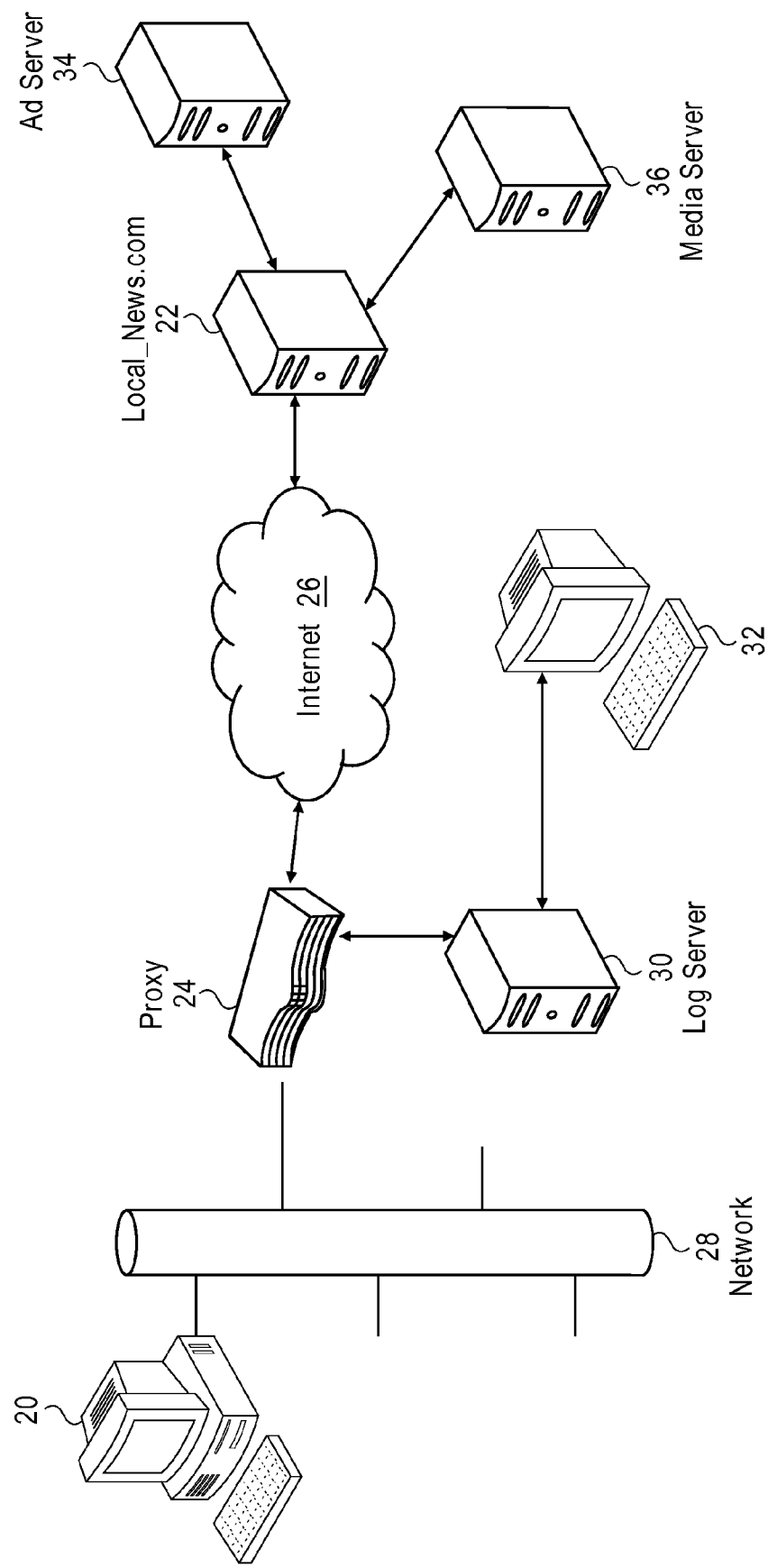
FIG. 2 illustrates an example of a network employing a proxy configured to log accesses by clients communicatively coupled thereto and report same to a log server.

Returning to FIG. 2, log server 30 may be configured to combine entries in the log file received from proxy 24 and store same as a condensed log file in accordance with an embodiment of the present invention. Alternatively, proxy 24 may be configured to produce the condensed log file prior to reporting same to log server 30 in accordance with yet a further embodiment of the present invention. In either instance, an analyst 32 may use the condensed log file to analyze network traffic.

Figure 3:
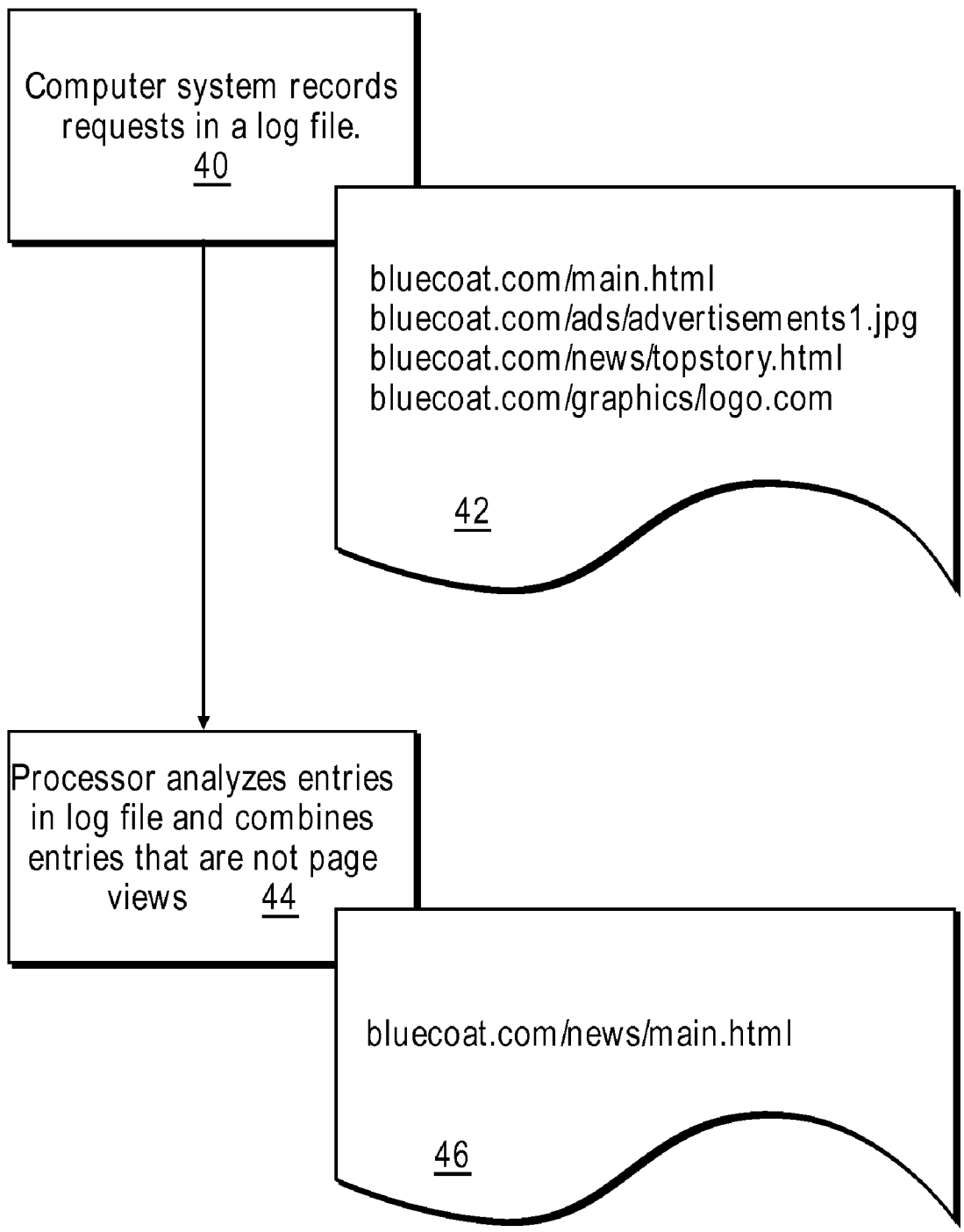
FIG. 3 depicts an example of a process for combining log file entries according to one embodiment of the present invention.

FIG. 3 depicts how entries in a log file may be combined in accordance with the present invention. A proxy, server or other computer system records requests in a conventional log file (40). An excerpt from the log file (42) shows a series of requests for data, including the original request as well as all of the calls for content to be included in the requested web page. In this example, a visitor has accessed the site bluecoat.com. When the user's browser accesses bluecoat.com, the "main.html" page is loaded. That page may include embedded links for certain content, including in this case "advertisements1.jpg" (an image associated with an advertisement), "topstory.html" (content included in an html page), and "logo.com" (another content item). All of these files are rendered within the context of the main.html page, which is a hypertext markup language page that requests the other entries on the log file from one or more servers as it loads. The processor configured to produce the condensed log file (e.g., proxy 24 or log server 30) analyzes the entries in the uncondensed log file and combines the entries that are not page views with the respective page views for such entries to produce a log file that contain only page views (44). In this example, the result is a single page view entry for "bluecoat.com/news/main.html" as displayed in the condensed log file (46). In some cases, the details of the condensed entries are preserved and stored, but such entries are not counted as page views.

There are a number of ways in which page views can be counted. For example, one approach is for the processor producing the condensed log file to attempt to combine referred requests that are not page views with the corresponding page view request, and then count all rows subsequently written to the condensed log file as page views. One limitation with this approach is that there are often, for various reasons, request lines in a log file that are not themselves page views, but which cannot be combined with a corresponding page view. With this approach the choices are to count these lines as page views, or leave them out of the condensed log file all together.

To improve the accuracy of page view counting, the present invention provides for counting page views separately from counting rows in a log file (or condensed log file). For example, the processor may be configured to determine whether or not an un-combined line is a page view or not, and to count only those condensed log file entries that appear to be page views as page views. Thus, the problem becomes one of delineating between page views and non-page view entries in a log file.

The processor may delineate page views (which will be maintained as unique entries in the condensed log file) from entries to be combined with page views in any of a number of ways. One approach takes into account the content type, status code, protocol scheme, and user agent associated with a log file entry. For example, only requests with a designated status code (e.g., 200), specified content type (e.g., "text/ html"), and designated user agent (e.g., one that represents a known type of web browser) will be counted as a page view, though this criteria may be modified by an analyst for a particular condensed log file profile. Other requests that are not determined to be page views can be filtered, combined with a corresponding page view, or added to the condensed log file as a non-page view entry, according to parameters configured by the analyst that will be using the condensed log file. For example, in some cases XML and/or AJAX requests may be added to the condensed log file but not counted as page view requests. In some case, it may be further necessary to determine whether or not a log file entry corresponds to a new page view or simply a new frame for an existing page view. Alternatively, each request for a frame may be counted as a page view.

In other instances, the processor producing the condensed log view may access a list of files (e.g., from a server), which list identifies which of the uncondensed log file entries should be counted as page views and which should be combined into other page views. Alternatively, the processor may be configured to consider only those uncondensed log file entries relating to a particular file type or particular file types as page views. Or, the processor may be configured to regard only page views generated by actual user actions in a browser (e.g., a browser running at computer system 20) as page views for purposes of the condensed log file.

In still another embodiment of the present invention, the processor producing the condensed log file analyzes the referring link for each subject entry in the uncondensed log file and determines whether the subject entry was requested by a specified type of document. For example, if an entry details a request received from an internal page, such as an html file, and the entry details an image file, it is likely that the image was loaded as part of the html file and should not be considered a page view itself. Thus, the log entry for the image file is combined with that for the html file.

In yet another embodiment of the invention, the processor producing the condensed log file examines the entries in the uncondensed log file and the time each such entry was recorded. The processor may be configured (e.g., through appropriate programming) to assume that a page takes no more than a predetermined time (e.g., five seconds or so) to load, and thus may combine all non-page view log entries recorded within that predetermined time of a known page view with that known page view in the condensed log file. In such cases, uncondensed log file entries outside of the predetermined time from the known page view are treated as new page views. The time interval described above may be set by a user (e.g., a network administrator). In some instances, the processor may be configured to combine only log file entries reflecting a common source IP address.

In still another embodiment of the invention, only uncondensed log file entries with a particular status or status code are retained as page views in the condensed log file. Other entries may be combined into these page views. If such configuration options are combined with options to record only page views for log entries of a particular type, such as log entries for html or text files, the result will be that the condensed log file will include page views only for uncondensed log file entries for a particular file type and with a particular status code.

In yet a further embodiment of the invention, after page views have been combined with other uncondensed log file entries, the processor performing the analysis may add the entries to a database. Each entry of the condensed log file will preferably become a record in the database. The use of such a database will allow for easy sorting and searching of log files.

For example, an analyst may search for the number of page views from a particular source or the number of page views of specific web pages during a certain time period.

In some instances, the condensed log file may be examined (e.g., by the same processor which prepared the condensed log file or by another processor) for entries from a particular source, such as entries from a web search spider, and eliminate them from the condensed log file. An analyst may configure the processor to automatically eliminate any log file entries from any particular source. This may be desirable to eliminate page views that should not be considered traffic, such as page views from the web server itself. This may be accomplished by identifying an IP address, storing the IP address, and eliminating all log entries that contain the IP address. In one embodiment, this takes place after the condensed log file entries have been added to the database.

At any point during the operation of the system, a user may deactivate the method used to combine page views. If a user elects this option, all log file entries will be added to the database.

Thus, systems and methods for producing condensed log files have been described. In the above description, many examples were discussed individually, but the reader should appreciate that some or all of the features associated with these examples may be included in a common configuration for a processor to create a condensed log file in accordance with the present invention. That is, various embodiments of the invention, although discussed individually, are not intended to be mutually exclusive.

What is claimed is:

1. A method, comprising automatically combining multiple entries within a log file, said entries describing traffic in a computer network, into a single page view entry in a condensed log file by (i) designating all non-page view entries in the log file that are recorded within a user-designated time of a page view entry in the log file as being related to the page view entry in the log file, and (ii) combining said non-page view entries in the log file with the page view entry in the log file to form the single page view entry in the condensed log file.

2. A method, comprising automatically combining multiple entries within a log file, said entries describing traffic in a computer network, into one or more page view entries in a condensed log file by (i) classifying the entries within the log file as page view entries or non-page view entries according to a status code associated with each respective entry in the log file, and (ii) combining those of the entries in the log file classified as non-page view entries with their respective page view entries in the log file to form the one or more page view entries in the condensed log file.

3. A method, comprising automatically combining multiple entries within a log file, said entries describing traffic in a computer network, into one or more page view entries in a condensed log file by (i) classifying the entries within the log file as page view entries or non-page view entries according to one or more parameters associated with each respective entry in the log file, and (ii) combining those of the entries in the log file classified as non-page view entries with their respective page view entries in the log file to form the one or more page view entries in the condensed log file.

4. The method of claim 3, wherein the one or more parameters include a status code associated with each respective entry in the log file.

5. The method of claim 3, wherein the one or more parameters include a content type associated with each respective entry in the log file.

6. The method of claim 5, wherein the one or more parameters further include a status code associated with each respective entry in the log file.

7. The method of claim 6, wherein the entries within the log file are classified as page views if the content type associated with each respective entry in the log file is text/html.

8. The method of claim 3, wherein criteria for classifying an entry as a page view is modifiable by a user.

* * * * *

UNITED STATES PATENT AND TRADEMARK OFFICE
CERTIFICATE OF CORRECTION

| | | |
|---|---|---|
| PATENT NO. | : 7,890,511 B2 | Page 1 of 1 |
| APPLICATION NO. | : 12/026475 | |
| DATED | : February 15, 2011 | |
| INVENTOR(S) | : Mikko Valimaki et al. | |

It is certified that error appears in the above-identified patent and that said Letters Patent is hereby corrected as shown below:

Title Page; item (75);

On the front page of the patent in the Inventors section:

• James Pettit Whitechurch, Draper, UT should read    -- James Pettit Whitchurch, Draper, UT --.

Signed and Sealed this
Thirteenth Day of September, 2011

David J. Kappos
*Director of the United States Patent and Trademark Office*